United States Patent
Kaethner et al.

(10) Patent No.: US 11,532,074 B2
(45) Date of Patent: Dec. 20, 2022

(54) PROVIDING A RESULTANT IMAGE DATASET AND PROVIDING A TRAINED GENERATOR FUNCTION

(71) Applicant: Siemens Healthcare GmbH, Erlangen (DE)

(72) Inventors: Christian Kaethner, Forchheim (DE); Sai Gokul Hariharan, Forchheim (DE)

(73) Assignee: Siemens Healthcare GmbH, Erlangen (DE)

( * ) Notice: Subject to any disclaimer, the term of this patent is extended or adjusted under 35 U.S.C. 154(b) by 177 days.

(21) Appl. No.: 16/923,527

(22) Filed: Jul. 8, 2020

(65) Prior Publication Data
US 2021/0019863 A1 Jan. 21, 2021

(30) Foreign Application Priority Data
Jul. 17, 2019 (DE) .................. 10 2019 210 545.9

(51) Int. Cl.
*G06T 5/00* (2006.01)
*G06N 20/00* (2019.01)
*G06N 7/00* (2006.01)

(52) U.S. Cl.
CPC .......... *G06T 5/002* (2013.01); *G06N 7/005* (2013.01); *G06N 20/00* (2019.01); *G06T 2207/10116* (2013.01); *G06T 2207/20081* (2013.01)

(58) Field of Classification Search
CPC .......... G06T 5/002; G06T 2207/10116; G06T 2207/20081; G06N 20/00; G06N 7/005
See application file for complete search history.

(56) References Cited

U.S. PATENT DOCUMENTS 10,032,256 B1 * 7/2018 Anaya .................. G06T 5/002
2019/0197358 A1 * 6/2019 Madani ................ G06T 7/0012
(Continued)

FOREIGN PATENT DOCUMENTS

| DE | 102019207238 A1 | 11/2020 |
| DE | 102019208496 A1 | 12/2020 |
| WO | WO-2021044153 A1 * | 3/2021 |

OTHER PUBLICATIONS

Kang, Eunhee et al.; "Cycle-consistent adversarial denoising network for multiphase coronary CT angiography"; Medical physics; 2019; 46. Jg.; Nr. 2; p. 550-562.
(Continued)

*Primary Examiner* — Khai M Nguyen
(74) *Attorney, Agent, or Firm* — Harness, Dickey & Pierce, P.L.C.

(57) ABSTRACT

A method is for providing a resultant image dataset for a volume of interest. In an embodiment, an X-ray image dataset for the volume of interest is received, having a first noise level. A trained generator function is received, a parameter of which is based on a first and a second training image dataset for a training volume of interest. The first and the second training image dataset include a first training noise level. In addition, a resultant image dataset for the volume of interest is determined by applying the trained generator function to input data comprising the X-ray image dataset, the resultant image dataset has a second noise level less than the first noise level. In addition, the resultant image dataset is provided. As such, a higher noise level can be accepted and/or a lower X-ray dose can be used in the acquisition of the X-ray image dataset.

16 Claims, 7 Drawing Sheets

(56) References Cited

U.S. PATENT DOCUMENTS

| | | | | |
|---|---|---|---|---|
| 2019/0198156 A1* | 6/2019 | Madani | ............... | G06V 10/764 |
| 2019/0365341 A1* | 12/2019 | Chan | .................... | A61B 6/5258 |
| 2020/0311878 A1* | 10/2020 | Matsuura | ............ | G06K 9/6256 |
| 2020/0364858 A1* | 11/2020 | Kaethner | ............ | G06N 3/0454 |
| 2020/0394790 A1* | 12/2020 | Kaethner | ............ | G06K 9/6267 |
| 2022/0196771 A1* | 6/2022 | Zur | ....................... | A61B 5/015 |

OTHER PUBLICATIONS

German Office Action dated Jun. 19, 2020.
Hariharan, Sai Gokul et al. "Simulation of Realistic Low Dose Fluoroscopic Images from their High Dose Counterparts" Bildverarbeitung für die Medizin 2018 (Algorithmen—Systeme—Anwendungen. Proceedings des Workshops vom 11. bis 13. Mar. 2018 in Erlangen) (pp. 80-85). Springer Vieweg, Berlin, Heidelberg. // https://doi.org/10.1007/978-3-662-56537-7_34.
Zhang, Kai et al.: "Beyond a Gaussian Denoiser: Residual Learning of Deep CNN for Image Denoising"; in: IEEE Transactions on Image Processing; 2017; DOI: 10.1109/TIP.2017.2662206; https://arxiv.org/pdf/1608.03981.pdf.
Lehtinen, J. et al. "Noise2Noise: Learning Image Restoration without Clean Data"; Proceedings of the 35 th International Conference on Machine Learning, 2018.
Goodfellow, Ian J. et al., "Generative Adversarial Networks", arXiv:1406.2661v1 of Jun. 10, 2014; XP055549980; pp. 1-9.
J.H. Siewerdsen et al. "Empirical and theoretical investigation of the noise performance of indirect detection, active matrix ?at-panel imagers (AMFPIs) for diagnostic radiology", Med. Phys., vol. 24, Nr. 1, 1997, pp. 71-89.
Ronneberger, Olaf et al. "U-Net: Convolutional Networks for Biomedical Image Segmentation" Medical Image Computing and Computer-Assisted Intervention (MICCAI), Springer, LNCS, vol. 9351, pp. 234-241, 2015 // arXiv:1505.04597 [cs.CV].

* cited by examiner

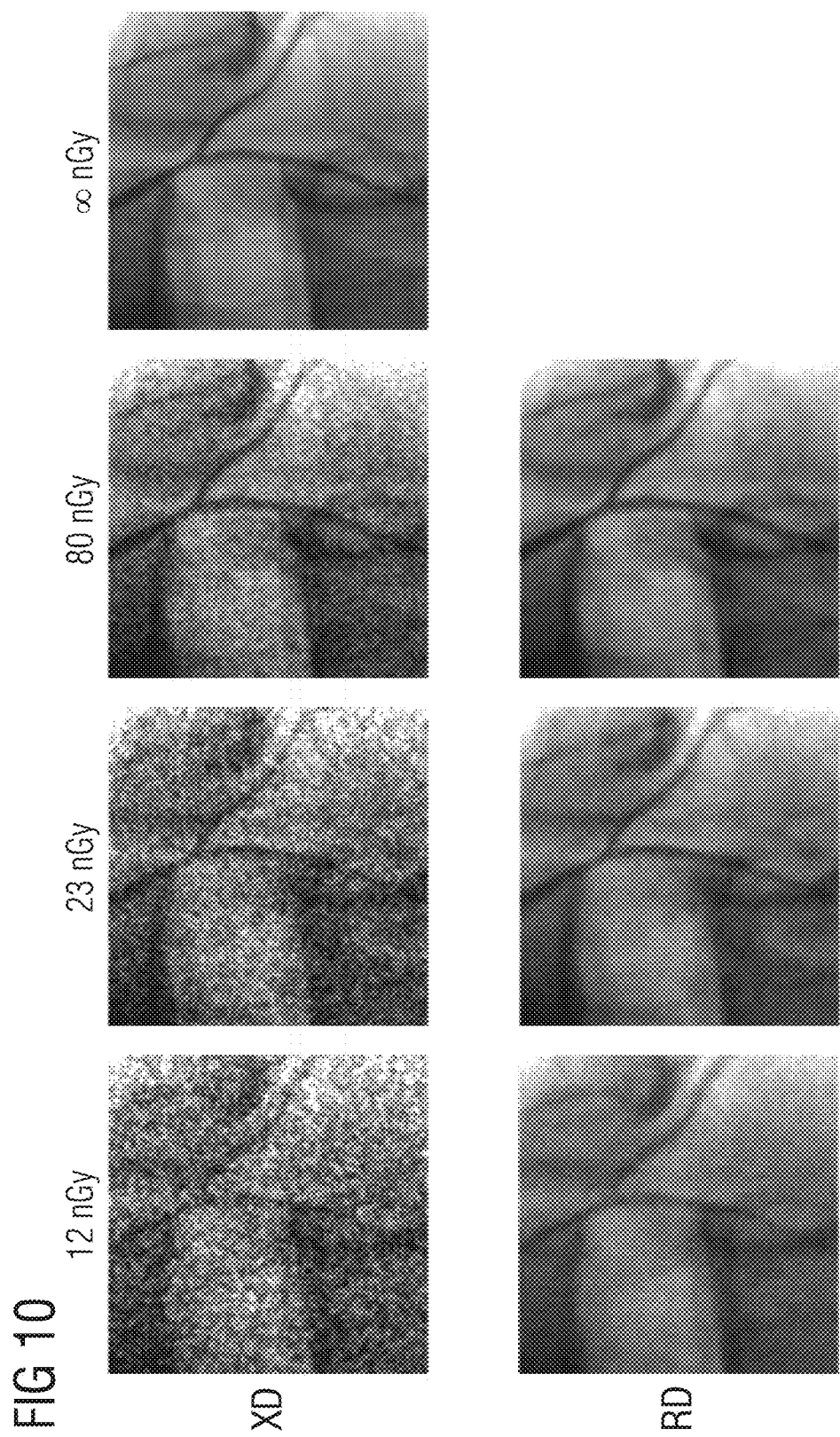

PROVIDING A RESULTANT IMAGE DATASET AND PROVIDING A TRAINED GENERATOR FUNCTION

PRIORITY STATEMENT

The present application hereby claims priority under 35 U.S.C. § 119 to German patent application number DE 102019210545.9 filed Jul. 17, 2019, the entire contents of which are hereby incorporated herein by reference.

FIELD

Embodiments of the invention generally relate to a method for providing a resultant data set and providing a trained generator function.

BACKGROUND

In medical practice, it is common to use X-ray apparatuses for monitoring (in particular minimally invasive) surgical interventions; sometimes certain interventions only become possible by virtue of X-ray monitoring, for instance the implantation of an aortic valve via a catheter.

The advantages of an X-ray intervention of this type must be weighed against the radiation exposure from the absorbed X-ray dose. Since reducing the X-ray dose is typically also accompanied by a reduction in the image quality or increase in the signal-to-noise ratio, it is often necessary to find a compromise between good image quality and low X-ray dose.

It is known to use various noise suppression methods to increase the image quality. These methods, however, can change the image appearance and/or cause artifacts. Employing too great a level of noise suppression can result in a cartoon-like image appearance, for example.

It is also known to optimize the signal-to-noise ratio by way of optimized protocols (i.e. by way of optimized selection of the parameters of the X-ray apparatus). Once again, however, this selecting of the protocols can change the image appearance (for instance the values of the image pixels may differ for the same imaged structure under different image acquisition values). This presents a problem in particular when the image data is meant to be processed further by trained algorithms, in particular when the algorithms used for the training have been acquired using only a limited number of protocols or a limited number of X-ray apparatuses.

SUMMARY

At least one embodiment of the invention defines improved options for noise reduction for X-ray image datasets.

Embodiments are directed to a computer-implemented method for providing a resultant image dataset, a computer-implemented method for providing a trained generator function, a provider system, an X-ray apparatus, a computer program product, and a computer-readable storage medium. The claims and the following description define advantageous developments.

The application is described below both with reference to the claimed apparatuses and with reference to the claimed method. Features, advantages or alternative embodiments mentioned in this connection can also be applied equally to the other claimed subject matter, and vice versa. In other words, the object-based claims (which claims are directed at an apparatus, for example) can also be developed by combining with features described or claimed in connection with a method. The corresponding functional features of the method are embodied by corresponding object-related modules in this case.

Furthermore, the embodiments are described both with reference to methods and apparatuses for providing resultant image datasets, and with reference to methods and apparatuses for providing trained generator functions. Features and alternative embodiments of data structures and/or functions in methods and apparatuses for providing resultant image datasets can also be applied to analogous data structures and/or functions in methods and devices for providing trained generator functions. The analogous data structures may be identified in particular by the use of the prefix "training". In particular, a training image dataset may be regarded as an analogous structure to an X-ray image dataset. In addition, the trained generator functions used in methods and apparatuses for providing resultant image datasets may have been adjusted and/or provided by methods and apparatuses for providing trained generator functions.

According to a first embodiment, the invention relates to a computer-implemented method for providing a resultant image dataset for a volume of interest. In this method, an X-ray image dataset for the volume of interest is received, wherein the X-ray image dataset has a first noise level. In addition, a trained generator function is received, wherein a parameter of the trained generator function is based on a first training image dataset and a second training image dataset for a training volume of interest, and wherein the first training image dataset and the second training image dataset have a first training noise level. In addition, a resultant image dataset for the volume of interest is determined by applying the trained generator function to input data comprising the X-ray image dataset, wherein the resultant image dataset has a second noise level, wherein the second noise level is less than the first noise level. In addition, the resultant image dataset is provided.

According to a second embodiment, the invention additionally relates to a computer-implemented method for providing a trained generator function. According to this embodiment, a first training image dataset for a training volume, and a second training image dataset for the training volume are received or determined, wherein the first training image dataset and the second training image dataset have a first noise level. In addition, a resultant image dataset is determined by applying the trained generator function to the second training image dataset, and a parameter of the trained generator function is adjusted on the basis of a comparison of the first training image dataset and the resultant image dataset. In addition, the trained generator function is provided, in particular the trained generator function is stored, displayed and/or transferred.

According to a third embodiment, the invention relates to a provider system for providing a resultant image dataset for a volume of interest, comprising an interface and a computing unit,
  wherein the interface is designed to receive an X-ray image dataset for the volume of interest,
wherein the X-ray image dataset has a first noise level,
  wherein the interface is also designed to receive a trained generator function,
wherein a parameter of the trained generator function is based on a first training image dataset and a second training image dataset for a training volume of interest, wherein the first training image dataset and the second training image dataset have a first training noise level, wherein the computing unit is designed to determine a resultant image dataset for the volume of interest by applying the trained generator function to input data comprising the X-ray image dataset, wherein the resultant image dataset has a second noise level, wherein the second noise level is less than the first noise level, wherein the interface is also designed to provide the resultant image dataset.

According to a fourth embodiment, the invention relates to an X-ray apparatus comprising a provider system according to an embodiment of the invention. The X-ray apparatus comprises in particular also an X-ray source and an X-ray detector. An X-ray apparatus may be in particular a C-arm X-ray apparatus or a computed tomography apparatus.

According to a possible fifth embodiment, the invention relates to a training system for providing a trained generator function, comprising a training interface and a training computing unit, wherein the training interface and/or the training computing unit are designed to receive or determine a first training image dataset for a training volume, and a second training image dataset for the training volume, wherein the first training image dataset and the second training image dataset have a first noise level, wherein the training computing unit is also designed to determine a resultant image dataset by applying the trained generator function to the second training image dataset, wherein the training computing unit is also designed to adjust a parameter of the trained generator function on the basis of a comparison of the first training image dataset and the resultant image dataset, wherein the training interface is also designed to provide the trained generator function.

According to a sixth embodiment, the invention relates to a computer program product comprising a computer program, which can be loaded directly into a memory of a provider system, and which contains program segments in order to perform all the steps of the method for providing a resultant image dataset, and embodiments of the method when the program segments are executed by the provider system, and/or which can be loaded directly into a training memory of a training system, and which contains program segments in order to perform all the steps of the method for providing a trained generator function and embodiments of the method when the program segments are executed by the training system.

In particular, at least one embodiment of the invention relates to a computer program product comprising a computer program, which can be loaded directly into a memory of a provider system, and which contains program segments in order to perform all the steps of the method for providing a resultant image dataset and embodiments of the method when the program segments are executed by the provider system.

In particular, at least one embodiment of the invention relates to a computer program product comprising a computer program, which can be loaded directly into a memory of a training system, and which contains program segments in order to perform all the steps of the method for providing a trained generator function and embodiments of the method when the program segments are executed by the training system.

According to a seventh embodiment, the invention relates to a computer-readable storage medium, on which are stored program segments which can be read and executed by a provider system in order to perform all the steps of the method for providing a resultant image dataset and embodiments of the method when the program segments are executed by the provider system, and/or on which are stored program segments which can be read and executed by a training system in order to perform all the steps of the method for providing a trained generator function and embodiments of the method when the program segments are executed by the training system.

In particular, at least one embodiment of the invention relates to a computer-readable storage medium, on which are stored program segments which can be read and executed by a provider system in order to perform all the steps of the method for providing a resultant image dataset and embodiments of the method when the program segments are executed by the provider system.

In particular, at least one embodiment of the invention relates to a computer-readable storage medium, on which are stored program segments which can be read and executed by a training system in order to perform all the steps of the method for providing a trained generator function and embodiments of the method when the program segments are executed by the training system.

According to an eighth embodiment, the invention relates to a computer program or a computer-readable storage medium comprising a trained generator function provided by a method for providing a trained generator function.

According to another embodiment, the invention relates to a computer-implemented method for providing a resultant image dataset for a volume of interest, comprising:

receiving an X-ray image dataset from the volume of interest, wherein the X-ray image dataset has a first noise level;

receiving a trained generator function, a parameter of the trained generator function being based on a first training image dataset and a second training image dataset for a training volume of interest, wherein the first training image dataset and the second training image dataset have a first training noise level;

determining a resultant image dataset for the volume of interest by applying the trained generator function received to input data including the X-ray image dataset received, wherein the resultant image dataset has a second noise level, the second noise level being less than the first noise level; and providing the resultant image dataset determined.

According to another embodiment, the invention relates to a computer-implemented method for providing a trained generator function, comprising:

receiving or determining a first training image dataset for a training volume and a second training image dataset for the training volume, wherein the first training image dataset and the second training image dataset have a first noise level;

determining a resultant image dataset by applying the trained generator function to the second training image dataset;

adjusting a parameter of the trained generator function based upon a comparison of the first training image dataset and the resultant image dataset; and providing the trained generator function.

According to another embodiment, the invention relates to a provider system for providing a resultant image dataset for a volume of interest, comprising:

an interface, designed to
- receive an X-ray image dataset for the volume of interest, wherein the X-ray image dataset has a first noise level, and
- receive a trained generator function, a parameter of the trained generator function being based on a first training image dataset and a second training image dataset for a training volume of interest, wherein the first training image dataset and the second training image dataset have a first training noise level;

a computing unit designed to
- determine a resultant image dataset for the volume of interest by applying the trained generator function to input data including the X-ray image dataset received, wherein the resultant image dataset has a second noise level, the second noise level being less than the first noise level, and
- wherein the interface is further designed to provide the resultant image dataset determined.

According to another embodiment, the invention relates to an X-ray apparatus comprising:
the provider system of an embodiment.

According to another embodiment, the invention relates to a non-transitory computer program product storing a computer program, directly loadable into a memory of a provider system, including program segments to perform the method of an embodiment when the program segments are executed by the provider system.

According to another embodiment, the invention relates to a non-transitory computer-readable storage medium, storing program segments readable and executable by a provider system to perform the method of an embodiment when the program segments are executed by the provider system.

According to another embodiment, the invention relates to a non-transitory computer-readable storage medium, storing a trained generator function provided by the method of an embodiment.

According to another embodiment, the invention relates to a non-transitory computer program product storing a computer program, directly loadable into a training memory of a training system, including program segments to perform the method of an embodiment when the program segments are executed by the training system.

According to another embodiment, the invention relates to a non-transitory computer-readable storage medium, storing program segments readable and executable by a training system to perform the method of an embodiment when the program segments are executed by the training system.

BRIEF DESCRIPTION OF THE DRAWINGS

The following description of the example embodiments, which are explained in greater detail in conjunction with the drawings, will clarify and elucidate the above-described properties, features and advantages of this invention, and the manner in which they are achieved. This description does not restrict the invention to these example embodiments. Identical components are denoted by the same reference signs in different figures, which are generally not shown to scale and in which:

FIG. 10 shows several examples of X-ray datasets for different noise levels, and associated resultant image datasets.

DETAILED DESCRIPTION OF THE EXAMPLE EMBODIMENTS

Figure 1:
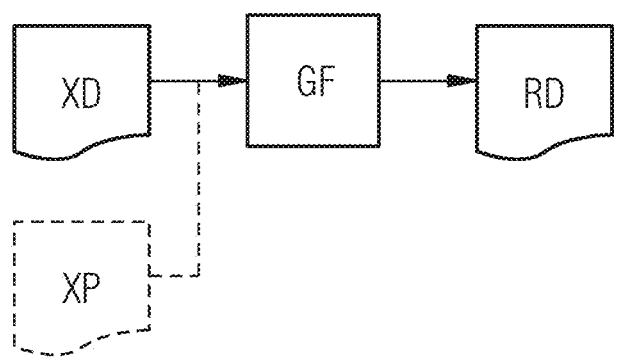
FIG. 1 shows a first data flow diagram for a method for providing a resultant image dataset.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or porcessors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, the invention relates to a computer-implemented method for providing a resultant image dataset for a volume of interest. In this method, an X-ray image dataset for the volume of interest is received, wherein the X-ray image dataset has a first noise level. In addition, a trained generator function is received, wherein a parameter of the trained generator function is based on a first training image dataset and a second training image dataset for a training volume of interest, and wherein the first training image dataset and the second training image dataset have a first training noise level. In addition, a resultant image dataset for the volume of interest is determined by applying the trained generator function to input data comprising the X-ray image dataset, wherein the resultant image dataset has a second noise level, wherein the second noise level is less than the first noise level. In addition, the resultant image dataset is provided.

The X-ray image dataset and the trained generator function are received in particular via an interface, in particular via an interface of a provider system. The resultant image dataset is determined in particular via a computing unit, in particular via a computing unit of the provider system.

A volume of interest (or region of interest, or ROI for short) or a training volume of interest is in particular part of an object under examination, which is represented in one or more image datasets. The image dataset may depict a segment of the (training) volume of interest, the entire (training) volume of interest excluding the surroundings of the (training) volume of interest, or the (training) volume of interest including the surroundings of the (training) volume of interest.

A volume of interest or training volume of interest is in particular three-dimensional; an image dataset for the (training) volume of interest may always have a different dimension, however. An example of a two-dimensional image dataset is an X-ray projection of the (training) volume of interest, or a slice of a tomographic acquisition of the (training) volume of interest; an example of a four-dimensional image dataset is a time-resolved tomographic acquisition of the (training) volume of interest.

The training volume of interest in particular can differ from the volume of interest.

An image dataset in particular comprises a plurality of pixels or voxels. Each pixel or voxel is assigned an intensity value. An image dataset may be in particular an X-ray image dataset. In the case of an X-ray image dataset, in particular each pixel or voxel is assigned an X-ray intensity value that is a measure of the X-ray intensity incident in this pixel or voxel or of an X-ray absorption coefficient of the pixel or voxel. An incident X-ray intensity depends on the number, size, shape and material of the objects located in the volume of interest and penetrated by the X-ray radiation. An image dataset can comprise in particular additional data, in particular metadata of an imaging examination, in particular of an X-ray examination.

A two-dimensional image dataset in this context comprises at least one two-dimensional representation of a volume of interest. A three-dimensional image dataset comprises at least one three-dimensional representation of a volume of interest; in particular a three-dimensional image dataset can also comprise additionally one or more two-dimensional representations of the volume of interest. A three-dimensional representation in particular may have three spatial dimensions, although a three-dimensional representation may also have two spatial dimensions and one time dimension. A three-dimensional image dataset in particular can be based on a reconstruction of a plurality of (spatially) two-dimensional image datasets. A four-dimensional image dataset in this context comprises at least one four-dimensional representation of a volume of interest. A four-dimensional representation of the volume of interest in particular may have three spatial dimensions and one time dimension. A four-dimensional image dataset in particular can be based on a reconstruction of a plurality of (spatially) two-dimensional image datasets and/or a plurality of (spatially) three-dimensional image datasets.

An image dataset can be designated in particular a real image dataset when it is the result of acquiring a volume of interest via an imaging apparatus, optionally using reconstruction algorithms. An image dataset can be designated in particular a synthetic image dataset when it is the result of an image processing function, in particular a trained image processing function.

The noise level of an image dataset in particular is a measure of noise in the image dataset. The noise level of an image dataset advantageously equals the signal-to-noise ratio of the image dataset. The noise level can also equal an inverse X-ray dose, in particular an inverse X-ray dose that was used in the acquisition of a real image dataset, or would have to be used in the acquisition of a synthetic image dataset in order to obtain the image appearance of the synthetic image dataset.

The first training image dataset and the second training image dataset in particular have a first noise level when the noise level of the first training image dataset equals the first noise level, and when the noise level of the second training image dataset equals. A noise level of an image dataset in particular also equals a specified noise level when the deviation of the noise level of the image dataset from the specified noise level lies in a statistically expected range. In particular, the noise level of an image dataset equals a specified noise level when the relative deviation of the noise level of the image dataset from the specified noise level is less than 10%, in particular less than 5%, in particular less than 2%, in particular less than A trained function is in particular a function that maps input data onto output data, where the output data depends additionally on at least one function parameter of the function, and where the function parameter can be adjusted by supervised learning, by semi-supervised learning and/or by unsupervised learning. The input data and/or the output data can comprise in this case in particular at least one image dataset in each case.

In particular, a trained generator function is a trained function, and a trained classifier function is a trained function. In the case of a trained function, one of its parameters need not necessarily have been adjusted already, and therefore "trainable function" can also replace the term "trained function", in particular "trainable generator function" can replace the term "trained generator function", and/or "trainable classifier function" can replace the term "trained classifier function". In particular, the terms "trained generator function" and "generator function" can be used synonymously, and/or the terms "trained classifier function" and "classifier function" can be used synonymously.

In the case of a trained generator function, the input data and the output data in particular comprise at least one image dataset. In the case of a trained classifier function, in particular the input data comprises at least one image dataset, and the outputs comprise one or more probability values. The probability value in particular equals the probability that the image dataset of the input data is a real image dataset or a synthetic image dataset. The term "classifier function" in particular can be replaced by the term "discriminator function" and/or by the term "discriminator and classifier function" or by the term "classifier and discriminator function".

The trained generator function comprises at least one parameter, where the output values of the trained generator function depend on the value(s) of the at least one parameter. A parameter of the trained generator function in particular is based on the first training image dataset and the second training image dataset when the parameter of the trained generator function has been modified and/or adjusted in order to optimize a cost function based on the first training image dataset and the second training image dataset. This includes the case in which a plurality of, or all, parameters of the trained generator function have been modified and/or adjusted in order to optimize a cost function based on the first training image dataset and the second training image dataset.

The inventors have recognized that by producing a resultant image dataset having a lower noise level, a higher noise level can be accepted and/or a lower X-ray dose can be used in the acquisition of the X-ray image dataset. Potential side effects of the X-ray radiation on the patient can thereby be minimized.

According to another embodiment of the invention, the parameter of the trained generator function is based on a comparison, in particular on a difference between the first training image dataset and the result of applying the trained generator function to the second training image dataset.

The inventors have recognized that by selecting the one parameter, or the plurality of parameters, of the trained generator function in this way, this function is designed to produce synthetic resultant image datasets that depict the volume of interest as accurately as possible.

According to another embodiment of the invention, at least a portion of the noise of the first training image dataset is statistically independent of a portion of the noise of the second training image dataset. In particular, the parameter of the trained generator function is based on optimizing a cost function, the cost function comprising a difference between the first training image dataset and the result of applying the trained generator function to the second training image dataset.

The inventors have recognized that by using training image datasets containing statistically independent noise, it is impossible according to information theory for the trained generator function to map the first training image dataset onto the second training image dataset, because the first training image dataset contains no information about the noise in the second training image dataset. In such a situation, a trained generator function is optimum (in particular it minimizes the associated cost function) when the noise level of the resultant image dataset is as low as possible. Thus the trained generator function can be designed to produce a resultant image dataset that is as noise-free as possible.

According to another embodiment of the invention, the first training image dataset and the second training image dataset are based on a training input image dataset, wherein the training input image dataset has a training noise level, wherein the training noise level is less than the first noise level. Thus in other words, the first training image dataset and the second training image dataset are derived from a single training input image dataset that in particular has a lower noise level.

The inventors have recognized that by this selection of the first and second training image datasets, these datasets depict the same training volume, and between the first and second training image datasets there are no differences resulting from a change in the training volume of interest (e.g. caused by an intentional or unintentional movement of the patient, or by different contrast agent concentrations) or resulting from a change in the imaging geometry. Hence the trained generator function is designed in particular to perform the best possible reconstruction of the structures that exist in the volume of interest.

According to another embodiment of the invention, the first training image dataset is based on a combination of the training input image dataset and first synthetic noise, and the second training image dataset is based on a combination of the training input image dataset and second synthetic noise. The training input image dataset may be in particular a real X-ray image dataset.

The first synthetic noise and/or the second synthetic noise may be in particular white noise (e.g. thermal noise), colored noise (e.g. $1/f$ noise or $1/f^2$ noise) and/or noise having a Gaussian distribution. In particular this noise may have a mean value of 0. The training input image dataset can be combined with the first or second synthetic noise in particular by adding the training input image dataset to the first or second synthetic noise respectively.

The training input image dataset in particular can have the same dimensionality as, or a higher dimensionality than, the first and second training image datasets. In particular, the training input image dataset may be a three-dimensional image dataset, and the first and second training image datasets may be a two-dimensional or three-dimensional image dataset (if in this case the first and second training image datasets are two-dimensional image datasets, the first and second training image datasets can be based on a projection or on a slice of the three-dimensional training input image dataset). Alternatively, the training input image dataset may be a two-dimensional image dataset, and the first and second training image datasets may be a two-dimensional image dataset.

The extent, measured in pixels or voxels, of the training input image dataset may be identical to the extent, measured in pixels or voxels, of the first and second training image datasets, in the relevant dimensions. Advantageously, the extent, measured in pixels or voxels, of the training input image dataset may be greater than the extent, measured in pixels or voxels, of the first and second training image datasets, in at least one relevant dimension, in particular in all the relevant dimensions. In this case, a plurality of pairs comprising first training image dataset and second training image dataset can be produced from one training input image dataset (the technical term is "batchwise processing"). For example, at least four pairs of training image datasets containing 256×256 pixels can be obtained from a training input image dataset of extent 512×512 pixels, although even more pairs can also be obtained if the pairs of training image datasets partially overlap.

The inventors have recognized that the first and second training image datasets can be produced particularly efficiently by combining a training input image dataset with synthetic noise.

According to another embodiment of the invention, the first training image dataset and/or the second training image dataset are based on the application of a variance stabilizing transformation. According to another possible embodiment of the invention, the method for providing a resultant image dataset additionally comprises applying a variance stabilizing transformation to the X-ray image dataset. The variance stabilizing transformation is applied in this case in particular via the computing unit, in particular via the computing unit of the provider system. The variance stabilizing transformation is applied in this case in particular before applying the trained generator function to the X-ray image dataset.

A variance stabilizing transformation in particular is a function (for applying to random numbers or noisy data), the application of which makes the variability of the resultant data less dependent on, or independent of, the mean value of the resultant data.

The inventors have recognized that using a variance stabilizing transformation corresponds to normalizing the input values to the trained generator function. The training of the trained generator function is made numerically more stable by this normalization, and therefore can be performed more efficiently and with less susceptibility to errors. In addition, a trained generator function that has been trained on the basis of specific noise levels can be applied to other noise levels more effectively and more robustly by using normalization, or in particular a variance stabilizing transformation.

According to another embodiment of the invention, the parameter of the trained generator function is based on a GA algorithm. In the GA algorithm, in particular a trained classifier function is applied to the difference between the first training image dataset and the result of applying the trained generator function to the second training image dataset.

A GA algorithm ("GA" is an acronym for "generative adversarial") comprises a generator function and a classifier function. In this context, the generator function produces synthetic data (another word is "virtual data"), and the classifier function discriminates between synthetic and real data. In particular, training the generator function and/or the classifier function achieves, on the one hand, that the generator function produces synthetic data that the classifier function incorrectly classifies as real, and on the other hand, that the classifier function can discriminate as effectively as possible between real data and synthetic data. According to game theory, a GA algorithm can also be regarded as a zero-sum game. The training of the generator function and/or of the classifier function in particular is based on minimizing a cost function in each case.

If the generator function and the classifier function are given by a network, in particular by an artificial neural network, then the GA algorithm is also referred to as a GA network (or "GAN", as the acronym for "generative adversarial network"). These are known in particular from the article by Ian J. Goodfellow, "Generative Adversarial Networks", arxiv 1406.2661 (2014), the entire contents of which are hereby incorporated herein by reference. The cost function can be minimized in particular via a gradient descent, and in particular via backpropagation.

A parameter of the trained generator function is based on a GA algorithm or on a GA network in particular such that the parameter of the trained generator function is identical to a parameter of the generator function of the GA algorithm or of the GA network. A parameter of the trained generator function is based on a GA algorithm or on a GA network in particular such that the trained generator function is identical to the generator function of the GA algorithm or of the GA network.

The inventors have recognized that by using a GA algorithm it can be achieved that the differences between the result of applying the trained generator function and a training image dataset are similar to differences from additional training image datasets. This achieves in particular that the trained generator function does not affect the quality of the image noise but affects only the quantity of the image noise.

According to another embodiment of the invention, the method for providing a resultant image dataset additionally comprises receiving an X-ray parameter. In this case, the X-ray parameter describes an X-ray source, an X-ray detector and/or an X-ray apparatus, and the input data comprises the X-ray parameter. The X-ray parameter can be received in particular via the interface, in particular via the interface of the provider system.

The X-ray parameter in particular describes the X-ray source that was used to acquire the X-ray image dataset, and/or the X-ray detector that was used to acquire the X-ray image dataset, and/or the X-ray apparatus that was used to acquire the X-ray image dataset.

An X-ray parameter describes in particular an X-ray source in the sense that the X-ray source can be identified on the basis of the X-ray parameter. For example, the X-ray parameter may comprise for this purpose a serial number or a model number of the X-ray source. An X-ray parameter describes in particular an X-ray detector in the sense that the X-ray detector can be identified on the basis of the X-ray parameter. For example, the X-ray parameter may comprise for this purpose a serial number or a model number of the X-ray detector. An X-ray parameter describes in particular an X-ray apparatus in the sense that the X-ray apparatus can be identified on the basis of the X-ray parameter. For example, the X-ray parameter may comprise for this purpose a serial number or a model number of the X-ray apparatus.

The inventors have recognized that using an X-ray parameter in the input data allows the trained generator function to take into account also specific properties of the X-ray source, the X-ray detector and/or the X-ray apparatus. For example, the noise from different X-ray detectors can have different power spectra, which the trained generator function can then learn and reconstruct.

According to a second embodiment, the invention additionally relates to a computer-implemented method for providing a trained generator function. According to this embodiment, a first training image dataset for a training volume, and a second training image dataset for the training volume are received or determined, wherein the first training image dataset and the second training image dataset have a first noise level. In addition, a resultant image dataset is determined by applying the trained generator function to the second training image dataset, and a parameter of the trained generator function is adjusted on the basis of a comparison of the first training image dataset and the resultant image dataset. In addition, the trained generator function is provided, in particular the trained generator function is stored, displayed and/or transferred.

The first and second training image datasets are received or determined in particular via a training computing unit and/or a training interface, in particular via the training computing unit and/or the training interface of a training system. The resultant image dataset is determined, and the parameter of the trained generator function is adjusted in particular via the training computing unit, in particular via the training computing unit of the training system. The trained generator function is provided in particular via the training interface, in particular via the training interface of the training system.

The inventors have recognized that by virtue of the described method, it is possible to provide a trained generator function that maps the X-ray image datasets having a high noise level onto image datasets having a lower noise level. By using the trained generator function, it is possible to accept X-ray image datasets having a higher noise level or to use a lower X-ray dose, because the noise can be reduced by applying the trained generator function. Potential side effects of the X-ray radiation on the patient can thereby be minimized.

According to another embodiment of the invention, the method for providing a trained function additionally comprises receiving a training input image dataset, wherein the training input image dataset has a training noise level, wherein the training noise level is less than the first noise level. According to this embodiment, the first training image dataset is determined on the basis of a combination of the training input image dataset and first synthetic noise, and the second training image dataset is determined on the basis of the training input image dataset and second synthetic noise. The training input image dataset is received in this case in particular via the training interface, in particular via the training interface of the training system.

The training input image dataset in particular can have the same dimensionality as, or a higher dimensionality than, the first and second training image datasets. In particular, the training input image dataset may be a three-dimensional image dataset, and the first and second training image datasets may be a two-dimensional or three-dimensional image dataset (if in this case the first and second training image datasets are two-dimensional image datasets, the first and second training image datasets can be based on a projection or on a slice of the three-dimensional training input image dataset). Alternatively, the training input image dataset may be a two-dimensional image dataset, and the first and second training image datasets may be a two-dimensional image dataset.

The extent, measured in pixels or voxels, of the training input image dataset may be identical to the extent, measured in pixels or voxels, of the first and second training image datasets, in the relevant dimensions. Advantageously, the extent, measured in pixels or voxels, of the training input image dataset may be greater than the extent, measured in pixels or voxels, of the first and second training image datasets, in at least one relevant dimension, in particular in all the relevant dimensions. In this case, a plurality of pairs comprising first training image dataset and second training image dataset can be produced from one training input image dataset (the technical term is "batchwise processing"). For example, at least four pairs of training image datasets containing 256×256 pixels can be obtained from a training input image dataset of extent 512×512 pixels, although even more pairs can also be obtained if the pairs of training image datasets partially overlap.

The first and/or second synthetic noise can take into account in particular the characteristics of an X-ray apparatus for which the trained generator function is specifically meant to be optimized. Examples of such characteristics are the gains and transfer functions of the scintillators, the photodiodes and the analog-to-digital converters of the X-ray detector.

The inventors have recognized that the first and second training image datasets can be produced particularly efficiently by combining a training input image dataset with synthetic noise.

According to another embodiment of the invention, the method for providing a trained function additionally comprises applying a variance stabilizing transformation to the first training image dataset and applying a variance stabilizing transformation to the second training image dataset. The variance stabilizing transformation is applied in particular via a computing unit, in particular via the computing unit of the training system. The variance stabilizing transformation is applied in particular before determining the resultant image dataset and before adjusting the parameter of the trained generator function.

The inventors have recognized that using a variance stabilizing transformation corresponds to normalizing the input values to the trained generator function. The training of the trained generator function is made numerically more stable by this normalization, and therefore can be performed more efficiently and with less susceptibility to errors.

According to another embodiment of the invention, the combination of the training input image dataset and the first and/or second synthetic noise is based on a Monte Carlo simulation, on adding the training input image dataset to the first and/or second synthetic noise, and/or on applying a trained function. In particular, the combination of the training input image dataset and the first synthetic noise is based on a Monte Carlo simulation, on adding the training input image dataset to the first synthetic noise, and/or on applying a trained function. In particular, the combination of the training input image dataset and the second noise is based on a Monte Carlo simulation, on adding the training input image dataset to the second synthetic noise, and/or on applying a trained function.

A Monte Carlo simulation involves simulating the paths of individual X-rays or X-ray quanta which can be absorbed and/or reflected according to probability distributions, which are assumed to be known. This process can take into account in particular the energy of the X-rays or of the X-ray quanta and the imaging geometry. A multiplicity of simulated X-rays or X-ray quanta are then averaged in order to produce a first or second training input image dataset. The training input image dataset can be used in particular to derive or define the probability distributions for the absorption and/or reflection in the training volume of interest.

In particular, colored noise can be used for the addition of synthetic noise. The color or power spectrum of the noise can be based in particular on the modulation transfer function or on known imaging errors of X-ray apparatuses, in particular of the X-ray apparatus for which the trained generator function is specifically adjusted.

Reference can be made in particular to the methods described in German patent applications 102019207238.0 and 102019208496.6, the entire contents of each of which are hereby incorporated herein by reference, for the case of applying a trained function (which is not the trained generator function).

The inventors have recognized that the described methods can produce especially realistic noise. The trained generator function hence has a particularly low error susceptibility when applied to real image data.

According to another embodiment of the invention, the method for providing a trained generator function comprises determining a first classification value by applying a trained classifier function to a difference between the resultant image dataset and the first training image dataset or the second training image dataset. In addition, the parameter of the trained generator function is also adjusted on the basis of the first classification value. The first classification value is determined in particular by applying the trained classifier function to a difference between the resultant image dataset and the first training image dataset, or by applying the trained classifier function to a difference between the resultant image dataset and the second training image dataset. The first classification value is determined in particular via the training computing unit, in particular via the training computing unit of the training system. The parameter of the trained generator function is adjusted on the basis of the first classification value in particular in the manner that the parameter is adjusted in order to optimize or minimize an adversarial cost function comprising the first classification value.

A classification value here relates in particular to a probability value for the probability that a difference from unprocessed training image data, or training image data derived directly from a training input image dataset, has been used as input values to the classifier function. When applying an ideal trained classifier function to a difference between the resultant image dataset and the first or second training image dataset, this probability value should hence be exactly or nearly 0; when applying an ideal trained classifier function to an expected difference image dataset, this probability value should be exactly or nearly 1.

The inventors have recognized that by using the first classification value, the parameter of the trained generator function is adjusted in the sense of a GA algorithm, or the trained generator function is trained in the sense of a GA algorithm, such that the trained generator function produces resultant image datasets that are as realistic as possible.

According to another embodiment of the invention, the method for providing a trained generator function additionally comprises determining a second classification value by applying the trained classifier function to an expected difference image dataset, and adjusting a parameter of the trained classifier function on the basis of the second classification value. The second classification value is determined, and the parameter of the trained classifier function is adjusted in particular via the training computing unit, in particular via the training computing unit of the training system.

The inventors have recognized that by using the second classification value, the parameter of the trained classifier function is adjusted in the sense of a GA algorithm, or the trained classifier function is trained in the sense of a GA algorithm, such that the trained classifier function can discriminate as effectively as possible between expected difference image datasets and differences from resultant image datasets and training image datasets. By simultaneously adjusting the trained generator function on the basis of classification values, this function is then designed to produce resultant image datasets that are as realistic as possible.

According to a third embodiment, the invention relates to a provider system for providing a resultant image dataset for a volume of interest, comprising an interface and a computing unit,
  wherein the interface is designed to receive an X-ray image dataset for the volume of interest, wherein the X-ray image dataset has a first noise level,
  wherein the interface is also designed to receive a trained generator function,
wherein a parameter of the trained generator function is based on a first training image dataset and a second training image dataset for a training volume of interest,
wherein the first training image dataset and the second training image dataset have a first training noise level,
  wherein the computing unit is designed to determine a resultant image dataset for the volume of interest by applying the trained generator function to input data comprising the X-ray image dataset,
wherein the resultant image dataset has a second noise level,
wherein the second noise level is less than the first noise level,
  wherein the interface is also designed to provide the resultant image dataset.

The provider system can be designed in particular to perform the above-described methods according to the invention for providing a resultant image dataset, and embodiments of the methods. The provider system is designed to perform these methods and embodiments thereof by the interface and the computing unit being designed to perform the relevant method steps.

According to a fourth embodiment, the invention relates to an X-ray apparatus comprising a provider system according to an embodiment of the invention. The X-ray apparatus comprises in particular also an X-ray source and an X-ray detector. An X-ray apparatus may be in particular a C-arm X-ray apparatus or a computed tomography apparatus.

According to a possible fifth embodiment, the invention relates to a training system for providing a trained generator function, comprising a training interface and a training computing unit,
  wherein the training interface and/or the training computing unit are designed to receive or determine a first training image dataset for a training volume, and a second training image dataset for the training volume,
wherein the first training image dataset and the second training image dataset have a first noise level,
  wherein the training computing unit is also designed to determine a resultant image dataset by applying the trained generator function to the second training image dataset,
  wherein the training computing unit is also designed to adjust a parameter of the trained generator function on the basis of a comparison of the first training image dataset and the resultant image dataset,
  wherein the training interface is also designed to provide the trained generator function.

The training system can be designed in particular to perform the above-described methods according to the invention for providing a trained generator function, and embodiments of the methods. The training system is designed to perform these methods and embodiments thereof by the training interface and the training computing unit being designed to perform the relevant method steps.

According to a sixth embodiment, the invention relates to a computer program product comprising a computer program, which can be loaded directly into a memory of a provider system, and which contains program segments in order to perform all the steps of the method for providing a resultant image dataset, and embodiments of the method when the program segments are executed by the provider system, and/or which can be loaded directly into a training memory of a training system, and which contains program segments in order to perform all the steps of the method for providing a trained generator function and embodiments of the method when the program segments are executed by the training system.

In particular, at least one embodiment of the invention relates to a computer program product comprising a computer program, which can be loaded directly into a memory of a provider system, and which contains program segments in order to perform all the steps of the method for providing a resultant image dataset and embodiments of the method when the program segments are executed by the provider system.

In particular, at least one embodiment of the invention relates to a computer program product comprising a computer program, which can be loaded directly into a memory of a training system, and which contains program segments in order to perform all the steps of the method for providing a trained generator function and embodiments of the method when the program segments are executed by the training system.

According to a seventh embodiment, the invention relates to a computer-readable storage medium, on which are stored program segments which can be read and executed by a provider system in order to perform all the steps of the method for providing a resultant image dataset and embodiments of the method when the program segments are executed by the provider system, and/or on which are stored program segments which can be read and executed by a training system in order to perform all the steps of the method for providing a trained generator function and embodiments of the method when the program segments are executed by the training system.

In particular, at least one embodiment of the invention relates to a computer-readable storage medium, on which are stored program segments which can be read and executed by a provider system in order to perform all the steps of the method for providing a resultant image dataset and embodiments of the method when the program segments are executed by the provider system.

In particular, at least one embodiment of the invention relates to a computer-readable storage medium, on which are stored program segments which can be read and executed by a training system in order to perform all the steps of the method for providing a trained generator function and embodiments of the method when the program segments are executed by the training system.

According to an eighth embodiment, the invention relates to a computer program or a computer-readable storage medium comprising a trained generator function provided by a method for providing a trained generator function.

An implementation largely in software has the advantage that even provider systems and training systems already in use can be easily upgraded by a software update in order to work in the manner according to the invention. The computer program product may comprise in addition to the computer program, if applicable, extra elements such as e.g. documentation and/or extra components, and also hardware components such as e.g. hardware keys (dongles etc.) for using the software.

FIG. 1 shows a first data flow diagram for a method for providing a resultant image dataset RD. In this example embodiment, the trained generator function GF is applied to the X-ray image dataset XD; the result of the application is the resultant image dataset RD=GF(XD).

In this example embodiment, both the X-ray image dataset XD and the resultant image dataset RD are each a two-dimensional image dataset, in particular an image dataset having two spatial dimensions. Alternatively, the X-ray image dataset XD and the resultant image dataset RD may also each be a three-dimensional image dataset; in this case a three-dimensional image dataset in particular can have three spatial dimensions or have two spatial dimensions and one time dimension. Alternatively, the X-ray image dataset XD and the resultant image dataset RD may also each be a four-dimensional image dataset, in particular an image dataset having three spatial dimensions and one time dimension.

In this example embodiment, the X-ray image dataset XD and the resultant image dataset RD have the same extent, measured in pixels or voxels, in each of the dimensions, so in particular there is a unique correspondence between pixels or voxels of the X-ray image dataset XD and the pixels or voxels of the resultant image dataset RD. Alternatively, the extent of the resultant image dataset RD may also differ from the extent of the X-ray image dataset XD; in particular it is conceivable that the extent of the X-ray image dataset XD is greater than the extent of the resultant image dataset, in at least one dimension.

In an alternative embodiment, the trained generator function GF can be applied additionally to an X-ray parameter XP. For example, the X-ray parameter XP comprises a model number of an X-ray apparatus XSYS. In this case, the resultant image dataset RD is hence calculated as RD=GF(XD, XP).

Figure 2:
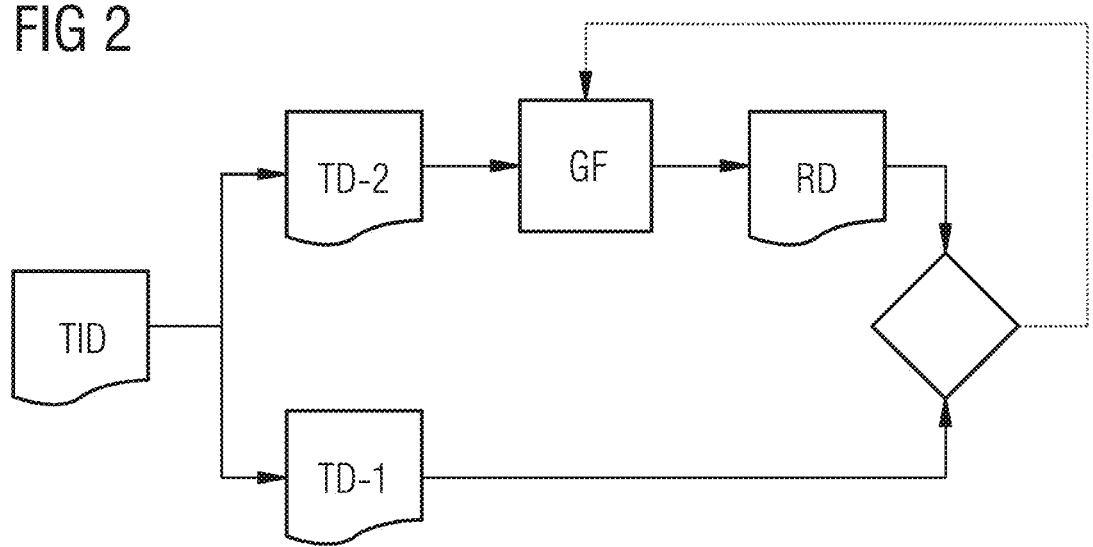
FIG. 2 shows a second data flow diagram for a method for providing a trained generator function.

FIG. 2 shows a second data flow diagram for a method for providing a trained generator function GF. The trained generator function GF and the resultant image dataset RD can here comprise all the embodiments and developments described with reference to FIG. 1. The first training image dataset TD-1 and the second training image dataset TD-2 can comprise in particular all the embodiments and developments of the X-ray image dataset XD described with reference to FIG. 1.

In this example embodiment, the first training image dataset TD-1 and the second training image dataset TD-2 are based on a training input image dataset TID, the training input image dataset TID having a lower noise level than the first training image dataset TD-1 and the second training image dataset TD-2. The first training image dataset TD-1 is produced in particular by combining first synthetic noise with the training input image dataset TID, and the second training image dataset TD-2 is produced in particular by combining second synthetic noise with the training input image dataset TID.

In the example embodiment shown, the trained generator function GF is applied to the second training image dataset TID-2, producing a resultant image dataset RD=GF(TD-2). In addition, a parameter of the trained generator function GF is adjusted on the basis of the resultant image dataset RD and the first training image dataset TD-1, in particular on the basis of a comparison of the resultant image dataset RD and the first training image dataset TD-1, in particular on the basis of the n-Norm $|RD-TD-1|_n$ of a difference between the resultant image dataset and the first training image dataset TD-1.

Figure 3:
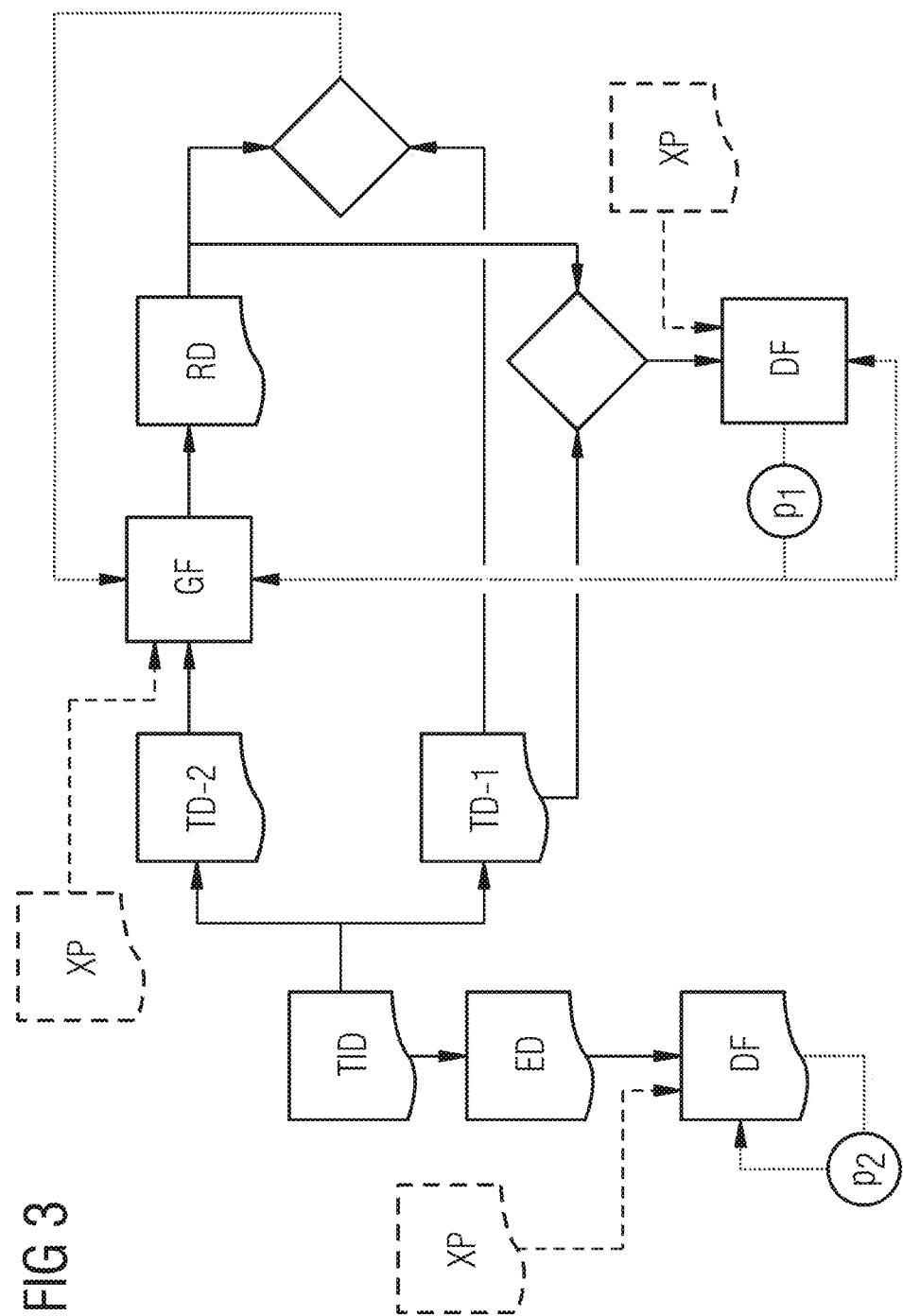
FIG. 3 shows a third data flow diagram for a method for providing a trained generator function.

FIG. 3 shows a third data flow diagram for a method for providing a trained generator function GF. The third data flow diagram here includes the second data flow diagram as a subset.

In the third data flow diagram shown, a trained classifier function DF is additionally applied to a difference image dataset, the difference image dataset relating to a difference between the first training image dataset TD-1 and the resultant image dataset RD. A first classification value $p1=DF(RD-TD-1)=DF(GF(TD-2)-TD-1)$ is thereby determined. This first classification value p1 can be used in particular to adjust a parameter of the trained generator function GF; the first classification value p1 can also be used to adjust a parameter of the trained classifier function DF.

In the example embodiment shown, the trained classifier function DF can also be applied to an expected difference image dataset ED in order to calculate a second classification value p2. The expected difference image dataset ED in this case is based on the training input image dataset TID; optionally the expected difference image dataset ED can also be based on the first training image dataset TID-1 and/or the second training image dataset TID-2. The second classification value p2 can be used to adjust a parameter of the trained classifier function DF.

As already described with reference to FIG. 1, it is also possible in this example embodiment to apply the trained generator function GF and/or the trained classifier function DF additionally to an X-ray parameter XP. For example, the X-ray parameter XP comprises a model number of an X-ray apparatus XSYS.

Figure 4:
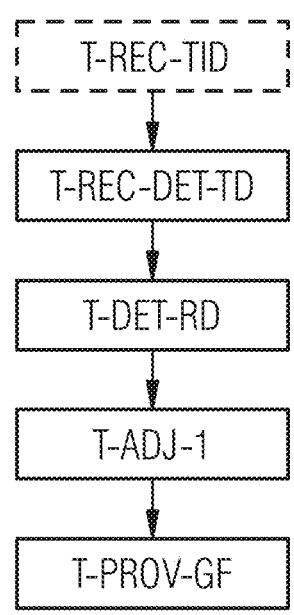
FIG. 4 shows a first example embodiment of a method for providing a trained generator function.

FIG. 4 shows a first example embodiment of a method for providing a trained generator function GF. The first example embodiment implements the second data flow diagram shown in FIG. 2.

A first, optional step of the first example embodiment is receiving T-REC-TID a training input image dataset TID for a training volume of interest TVOL via a training interface TIF. The training input image dataset TID has a training noise level. In this example embodiment, the training noise level equals the inverse signal-to-noise ratio of the training input image dataset TID.

The second step of the example embodiment shown is receiving or determining a first training image dataset TD-1 for the training volume of interest TVOL and a second training image dataset TD-2 for the training volume of interest TVOL via the training interface TIF or a training computing unit TCU. The first training image dataset TD-1 and the second training image dataset TD-2 have a first noise level. In this example embodiment, the first noise level equals the inverse signal-to-noise ratio of the first training image dataset TD-1 and of the second training image dataset TD-2.

In the example embodiment shown, both the first training image dataset TD-1 and the second training image dataset TD-2 are two-dimensional image datasets. Alternatively, it is also possible to use a first training image dataset TD-1 and/or a second training image dataset TD-2 having a different dimensionality. In addition in this example embodiment, the extent, measured in pixels or voxels, of the first training image dataset TD-1 and of the second training image dataset TD-2 is identical in each dimension. Alternatively, it is also possible to use a first training image dataset TD-1 and a second training image dataset TD-2 having a different extent.

If the optional step of receiving T-REC-TID the training input image dataset TID is performed as in this example embodiment, then in particular the first training image dataset TD-1 is determined on the basis of a combination of the training input image dataset TID and first synthetic noise via the training computing unit TCU, and the second training image dataset TD-2 is determined on the basis of the training input image dataset TID and second synthetic noise via the training computing unit TCU. In this case the training noise level is less than the first noise level. If the optional step of receiving T-REC-TID the training input image dataset TID is not performed, the first training image dataset TID-1 and the second training image dataset TID-2 can be received in particular via the training interface TIF.

In this example embodiment, the first synthetic noise and second synthetic noise respectively is Gaussian noise. In particular, the noise in each pixel or voxel is independent both on the intensity value of the corresponding pixel in the training input image dataset TID and on the value of the noise in the other pixels. It therefore holds that $(TD-1)_i = (TID)_i + G(0, \sigma)$ and $(TD-2)_i = (TID)_i + G(0, \sigma)$, where $(X)_i$ denotes the $i^{th}$ pixel of an image dataset, and $G(\mu, \sigma)$ denotes a random number having a Gaussian distribution and mean value $\mu$ and standard deviation $\sigma$. An equivalent formulation of this equation is $(TD-1)_i = G((TID)_i, \sigma)$ and $(TD-2)_i = G((TID)_i, \sigma)$. In particular, the noise level could also be identified in this case by the standard deviation $\sigma$.

Alternatively, it is also possible to use Poisson noise. Poisson noise is relevant in particular when a signal is produced by a finite (in particular small) number of particles (for instance by X-ray photons in an X-ray detector XSYS-.DTC), and this number is small enough to make the deviations of the Poisson distribution from the normal distribution relevant. In this case, the noise in each pixel is dependent on the intensity value of the pixel; it therefore holds that $(TD-1)_i = P((TID)_i)$ and $(TD-2)_i = P((TID)_i)$, where $P(\mu)$ is a random number having a Poisson distribution and a mean value $\mu$ and variance $\sigma^2 = \mu$.

Alternatively, it is also possible to use random-valued impulse noise. In this case, a specified number of pixels or voxels of the training input image dataset TID are set to a minimum intensity value or a maximum intensity value, where the pixels or voxels are randomly selected.

Alternatively, it is also possible to use for producing synthetic noise one of the methods described in the publication S. G. Hariharan et al., "An analytical approach for the simulation of realistic low-dose fluoroscopic images", Int. Journal of Computer Assisted Radiology and Surgery (2019), pp. 601-610, the entire contents of which are hereby incorporated herein by reference. Alternatively, it is also possible to use a Monte Carlo simulation to produce synthetic noise.

The third step of the first example embodiment shown is determining T-DET-RD a resultant image dataset RD by applying the trained generator function GF to the second training image dataset TD-2 via the training computing unit TCU.

In this example embodiment, the resultant image dataset RD is also a two-dimensional image dataset; in particular the resultant image dataset has the same extent, measured in pixels or voxels, as the second training image dataset TD-2 in each dimension.

In this example embodiment, the trained generator function GF is an artificial neural network, in particular a convolutional neural network. The trained generator function GF is applied to the second training image dataset TD-2 by using the intensity values of the pixels or voxels of the second training image dataset TD-2 as input values for the first node layer of the trained generator function GF. The intensity values of the resultant image dataset RD then equal the resultant values of the last node layer of the trained generator function GF. The resultant image dataset is hence in particular given by RD=GF(TD-2). Optionally, an X-ray parameter XP can be used as an additional input value. There may exist for the trained generator function in particular a U-net architecture, which is known, for example, from the publication O. Ronneberger et al.,"U-Net: Convolutional Networks for Biomedical Image Segmentation" MICCAI, Springer LNCS 9351: 234-241, 2015, the entire contents of which are hereby incorporated herein by reference.

A further step of the example embodiment shown is adjusting T-ADJ-1 a parameter of the trained generator function GF on the basis of a comparison of the first training image dataset TD-1 and the resultant image dataset RD via the training computing unit TCU.

In this example embodiment, the adjustment T-ADJ-1 of the parameter is based on minimizing a cost function on the basis of the backpropagation algorithm. The cost function includes in particular a difference between the first training image dataset TD-1 and the resultant image dataset RD, in particular a norm of the difference between the first training image dataset TD-1 and the resultant image dataset RD, in particular a pixel-by-pixel or voxel-by-voxel norm of the difference between the first training image dataset TD-1 and the resultant image dataset RD:

$$K \propto \|RD-TD-1\|_2 = \sum_{pixel\ i} (RD_i - (TD-1)_i)^2$$

Using this cost function achieves that the parameter of the trained generator function GF is adjusted in such a way that the noise level of the output data from the trained generator function GF is lower than the noise level of the corresponding input data to the trained generator function GF.

This can be ascertained easily from the following considerations. The first image dataset TD-1 comprises in pixel i a signal component $\mu_i$ and a noise component $r_i^{(1)}$, and therefore $(TD-1)_i = \mu_i + r_i^{(1)}$; and the second image dataset TD-2 comprises in pixel i a signal component $\mu_i$ and a noise component $r_i^{(2)}$, and therefore $(TD-2)_i = \mu_i + r_i^{(2)}$. In this case, the signal components match (because the first training image dataset TD-1 and the second training image dataset TD-2 have been derived from the training input image dataset TID, or relate to the same training volume of interest TVOL). When applying the trained generator function GF to the second image dataset TD-2, the trained generator function GF cannot reconstruct the noise component $r_i^{(1)}$ because the input data does not contain any information about this component. The smallest contribution of the $i^{th}$ pixel to the cost function is therefore given when $GF(TD-2)_i = \mu_i$, with the contribution to the cost function being $(r_i^{(1)})^2$ in this case. A similar discussion appears in the publication J. Lehtinen et al, "Noise2Noise: Learning Image Restoration without Clean Data", PLMR 80:2965-2974, 2018, the entire contents of which are hereby incorporated herein by reference.

The final step of the example embodiment shown is providing T-PROV-GF the trained generator function GF via the training interface TIF. The providing T-PROV-GF can include, in particular, storing, displaying and/or transferring the trained generator function GF. In particular, the trained generator function can be transferred to a provider system or used in a method for providing a resultant image dataset according to the invention and embodiments thereof.

Figure 5:
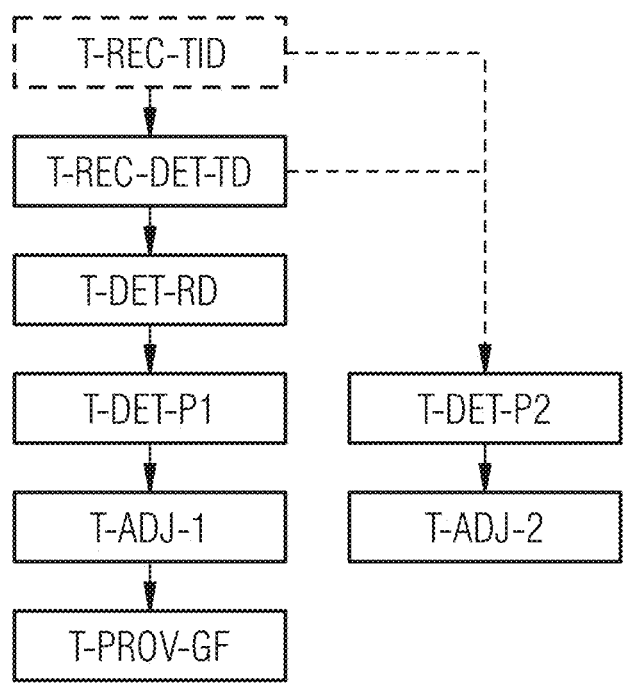
FIG. 5 shows a second example embodiment of a method for providing a trained generator function.

FIG. 5 shows a second example embodiment of a method for providing a trained generator function GF. The second example embodiment implements the third data flow diagram shown in FIG. 3.

The second example embodiment comprises several steps from the first example embodiment shown in FIG. 4. These steps can comprise all the embodiments and developments described with reference to the first example embodiment.

The second example embodiment additionally comprises determining T-DET-P1 a first classification value p1 by applying a trained classifier function DF to a difference between the resultant image dataset RD and the first training image dataset TD-1, and therefore $p_1 = DF(RD-TD-1)$. Alternatively, the first classification value $p_1$ can be applied by applying the trained classifier function DF to a difference between the resultant image dataset RD and the second training image dataset TD-2, and then in this case $p_1 = DF(RD-TD-2)$.

The first classification value $p_1$ is a probability value between 0 and 1 which defines a probability that a difference from unprocessed training image data, or training image data derived directly from a training input image dataset TID, has been used as input values to the trained classifier function DF.

In this example embodiment, the parameter of the trained generator function GF is additionally adjusted T-ADJ-1 on the basis of the first classification value $p_1$. In particular, the parameter is adjusted in order to optimize a cost function on the basis of the first classification value $p_1$. For example, the cost function may comprise an adversarial component $K^{(A)}_{GF} = -BCE(DF(RD-TD-1), 1) = -\log(p_1)$, where BCE denotes the binary cross-entropy given by $BCE(z, z') = z'\log(z) + (1-z')\log(1-z)$. The complete cost function of the trained generator function is then given by $$K = \|RD-TD-1\|_2 - \log(p_1)$$

The example embodiment additionally comprises determining T-DET-P2 a second classification value $p_2$ by applying the trained classifier function DF to an expected difference image dataset via the training computing unit TCU. In this example embodiment, the expected difference image dataset corresponds to the expected noise of a training image dataset TD-1, TD-2, and therefore it holds for the second classification value that $p_2 = DF(TID-TD-1)$ or $p_2 = DF(TID-TD-2)$. In addition, this example embodiment comprises adjusting T-ADJ-2 a parameter of the trained classifier function DF on the basis of the second classification value $p_2$. In particular, the parameter is adjusted in order to optimize a cost function on the basis of the second classification value $p_2$, in particular additionally on the basis of the first classification value $p_1$. In this example embodiment, an adversarial cost function is used as the cost function of the trained classifier function DF, for instance $K = -BCE(DF(TID-TD-1), 1) - BCE(DF(RD-TD-1), 0) = -BCE(p_2, 1) - BCE(p_1, 0) = -\log(p_2) - \log(1-p_1)$. The cost function of the trained classifier function DF can obviously also comprise additional components, in particular a Kullback-Leibler divergence (KL divergence for short) and/or a Wasserstein cost function (based on a Wasserstein metric).

Even if not explicitly stated, individual example embodiments, or individual sub-embodiments or features of these example embodiments, can be combined with, or substituted for, one other, if this is practical and within the meaning of the invention, without departing from the present invention. Without being stated explicitly, advantages of the invention that are described with reference to one example embodiment also apply to other example embodiments, where transferable.

Figure 6:
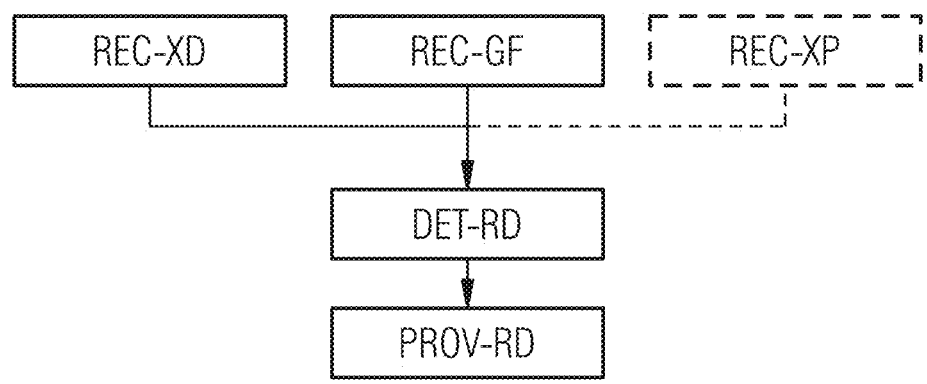
FIG. 6 shows an example embodiment of a method for providing a resultant image dataset.

FIG. 6 shows an example embodiment of a method for providing a resultant image dataset RD. The example embodiment implements the first data flow diagram shown in FIG. 1. It is also possible in this example embodiment to use a trained generator function GF that has been provided by one of the example embodiments shown in FIG. 4 and FIG. 5.

One step of the example embodiment shown is receiving REC-XD an X-ray image dataset XD for the volume of interest VOL via an interface IF, in particular the interface IF of a provider system PRVS. The X-ray image dataset XD has a first noise level. In this example embodiment, the noise level is in particular the inverse signal-to-noise ratio.

In this example embodiment, the X-ray image dataset XD is a two-dimensional image dataset of extent 512×512 pixels. It is also possible, however, for the X-ray image dataset XD to have another dimensionality.

A further step of the example embodiment shown is receiving REC-GF a trained generator function GF via the interface IF, in particular via the interface IF of the provider system PRVS. A parameter of the trained generator function is based here on a first training image dataset TD-1 and a second training image dataset TD-2 for a training volume of interest TVOL. The training volume of interest TVOL in particular differs from the volume of interest VOL. In addition, the first training image dataset TD-1 and the second training image dataset TD-2 have a first training noise level. This first training noise level can match the first noise level, or the first training noise level can differ from the first noise level.

A further optional step of the example embodiment shown is receiving REC-XP an X-ray parameter XP via the interface IF, in particular via the interface IF of the provider system PRVS. The X-ray parameter XP describes an X-ray source XSYS.SRC, an X-ray detector XSYS.DTC and/or an X-ray apparatus XSYS.

In this example embodiment, the X-ray parameter XP comprises a model number of the X-ray apparatus XSYS used in the acquisition of the X-ray image dataset XD. Alternatively, the X-ray parameter can also comprise a model number of the X-ray source XSYS.SRC used in the acquisition of the X-ray image dataset XD, and of the X-ray detector XSYS.DTC used in the acquisition of the X-ray image dataset.

A further step of the example embodiment shown is determining DET-RD a resultant image dataset RD of the volume of interest VOL by applying the trained generator function GF to input data comprising X-ray image dataset XD via a computing unit CU, in particular via the computing unit CU of the provider system PRVS. The resultant image dataset RD here has a second noise level, where the second noise level is less than the first noise level. If the optional step of receiving REC-XP the X-ray parameter XP is performed, the input data may comprise in particular the X-ray parameter XP.

As an alternative to using the X-ray parameter XP as additional input data, for applying the trained generator function it would also always be possible to use or to train a separate trained function for each of the types of X-ray apparatuses XSYS, X-ray sources XSYS.SRC and/or X-ray detectors XSYS.DTC used, or even for each of the X-ray apparatuses XSYS, X-ray sources XSYS.SRC and/or X-ray detectors XSYS.DTC used.

The resultant image dataset RD in particular has the same dimensionality as the X-ray image dataset XD; in this example embodiment the resultant image dataset is therefore likewise a two-dimensional image dataset. In addition, the resultant image dataset RD in particular has the same extent, measured in pixels and/or voxels, as the X-ray image dataset XD in each dimension; in this example embodiment the resultant image dataset XD therefore has an extent of 512×512 pixels.

The final step of the example embodiment shown is providing PROV-RD the resultant image dataset RD, in particular via the interface IF, in particular via the interface IF of the provider system PRVS. In this example embodiment, the resultant image dataset RD is displayed to an operator.

Figure 7:
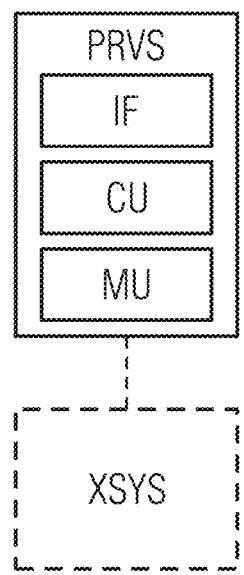
FIG. 7 shows a provider system.
Figure 8:
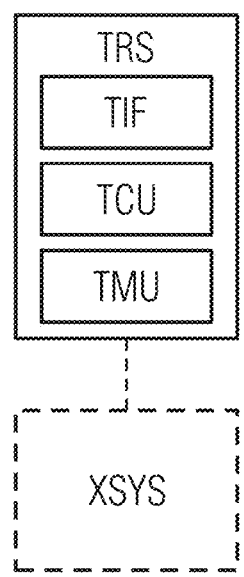
FIG. 8 shows a training system.

FIG. 7 shows a provider system PRVS; FIG. 8 shows a training system TSYS. The depicted provider system PRVS is designed to perform a method according to the invention for providing a resultant image dataset RD. The depicted training system TSYS is designed to perform a method according to the invention for providing a trained generator function GF. The provider system PRVS comprises an interface IF, a computing unit CU, and a memory unit MU; the training system TSYS comprises a training interface TIF, a training computing unit TCU, and a training memory unit TMU.

The provider system PRVS and/or the training system TSYS may be in particular a computer, a microcontroller or an integrated circuit. Alternatively, the provider system PRVS and/or the training system TSYS may be a real or virtual interconnection of computers (a real interconnection is referred to as a "cluster" and a virtual interconnection is referred to as a "Cloud"). The provider system PRVS and/or the training system TSYS may also be embodied as a virtual system, which is implemented on a real computer or a real or virtual interconnection of computers (virtualization).

An interface IF and/or a training interface TIF may be a hardware or software interface (for instance PCI bus, USB or FireWire). A computing unit CU and/or a training computing unit TCU may comprise hardware elements or software elements, for instance a microprocessor or what is known as a field programmable gate array (FPGA). A memory unit MU and/or a training memory unit TMU may be implemented as a non-permanent main memory (random access memory or RAM for short) or as a permanent mass storage device (hard disk, USB stick, SD card, solid state disk).

The interface IF and/or the training interface TIF may comprise in particular a plurality of sub-interfaces, which implement different steps of the respective methods. In other words, the interface IF and/or the training interface TIF can also be regarded as a multiplicity of interfaces IF or a multiplicity of training interfaces TIF respectively. The computing unit CU and/or the training computing unit TCU may comprise in particular a plurality of sub-computing units, which implement different steps of the respective methods. In other words, the computing unit CU and/or the training computing unit TCU can also be regarded as a multiplicity of computing units CU or a multiplicity of training computing units TCU respectively.

Figure 9:
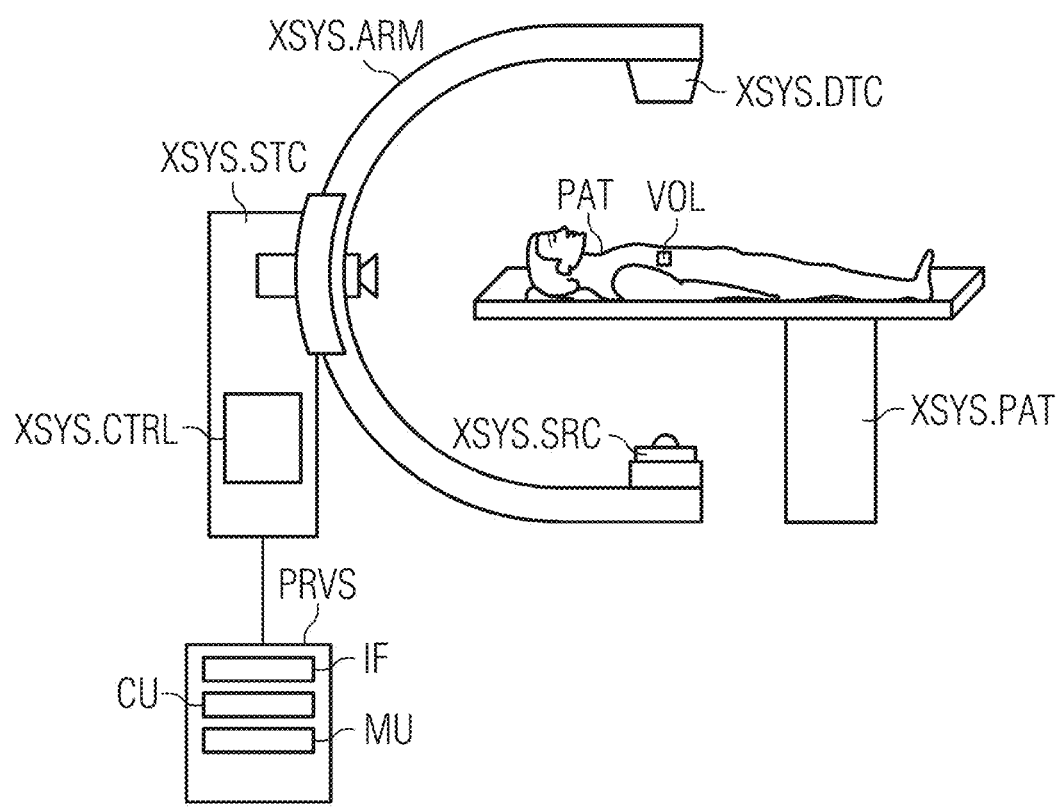
FIG. 9 shows an X-ray apparatus.

FIG. 9 shows an X-ray apparatus XSYS connected to a provider system PRVS. In the example embodiment shown, the X-ray apparatus XSYS is a C-arm X-ray apparatus XSYS. The C-arm X-ray apparatus XSYS comprises an X-ray source XSYS.SRC for emitting X-rays. The C-arm X-ray apparatus XSYS also comprises an X-ray detector XSYS.DTC for receiving X-rays. The X-ray source XSYS.SRC and the X-ray detector XSYS.DTC are attached to the two different ends of the C-arm XSYS.ARM. The C-arm XSYS.ARM of the C-arm X-ray apparatus XSYS is attached to a stand XSYS.STC. The stand XSYS.STC comprises drive elements which are designed to alter the position of the C-arm XSYS.ARM. In particular, the C-arm XSYS.ARM can be rotated about two different axes. The C-arm X-ray apparatus additionally comprises a control and analysis unit XSYS.CTRL and a patient positioning apparatus XSYS.PAT, on which a patient PAT can be supported. The control and analysis unit XSYS.CTRL can be used to adjust the position of the C-arm XSYS.ARM, to rotate the C-arm XSYS.ARM about the volume of interest VOL and to acquire X-ray image datasets for the volume of interest VOL. As an alternative to the example embodiment shown, it is also possible for the provider system PRVS to be implemented as part of the control and analysis unit XSYS.CTRL.

FIG. 10 shows several examples of X-ray image datasets XD (acquired using different X-ray doses, and hence having noise levels of different strength) and associated resultant image datasets RD, which have been obtained using the method according to the invention by applying the trained generator function GF to the X-ray image datasets XD.

The X-ray image datasets XD are two-dimensional X-ray projections of an anthropomorphic thorax phantom using different X-ray doses (12 nGy, 23 nGy, 80 nGy), and also a noise-free reference image (∞ nGy), where the noise-free reference image has been obtained by averaging a multiplicity of X-ray projections.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing a resultant image dataset for a volume of interest, the method comprising:
   receiving an X-ray image dataset from the volume of interest, wherein the X-ray image dataset has a first noise level;
   receiving a trained generator function, a parameter of the trained generator function being based on a first training image dataset and a second training image dataset for a training volume of interest, wherein the first training image dataset and the second training image dataset have a first training noise level, and wherein the trained generator function is a generator function of a generative adversarial algorithm;
   determining the resultant image dataset for the volume of interest by applying the trained generator function to input data including the X-ray image dataset, wherein the resultant image dataset has a second noise level, the second noise level being less than the first noise level; and
   providing the resultant image dataset.

2. The method of claim 1, wherein the parameter of the trained generator function is based on a difference between the first training image dataset and a result of applying the trained generator function to the second training image dataset.

3. The method of claim 2, wherein at least a portion of the noise of the first training image dataset is statistically independent of a portion of the noise of the second training image dataset.

4. The method of claim 2, further comprising:
   receiving an X-ray parameter, the X-ray parameter describing at least one of an X-ray source, an X-ray detector, or an X-ray apparatus,
   wherein the input data includes the X-ray parameter.

5. The method of claim 1, wherein the first training image dataset and the second training image dataset are based on a training input image dataset, wherein the training input image dataset includes a second training noise level, and wherein the second training noise level is less than the first noise level.

6. The method of claim 5, further comprising:
   generating the first training image dataset based upon a combination of the training input image dataset and first synthetic noise; and
   generating the second training image dataset based upon a combination of the training input image dataset and second synthetic noise.

7. The method of claim 1, further comprising:
   receiving an X-ray parameter, the X-ray parameter describing at least one of an X-ray source, an X-ray detector or an X-ray apparatus,
   wherein the input data includes the X-ray parameter.

8. A non-transitory computer-readable storage medium, storing program segments readable and executable by a provider system to perform the method of claim 1 when the program segments are executed by the provider system.

9. A computer-implemented method for providing a trained generator function, the method comprising:
   receiving a training input dataset, wherein the training input dataset has a training noise level;
   receiving or determining a first training image dataset for a training volume, the first training image dataset determined based upon a combination of the training input dataset and first synthetic noise, the first training image dataset having a first noise level greater than the training noise level;
   receiving or determining a second training image dataset for the training volume, the second training image dataset determined based upon a combination of the training input dataset and a second synthetic noise, and the second training image dataset having the first noise level, wherein the combination of the training input dataset and at least one of the first synthetic noise or the second synthetic noise is based on at least one of
   a Monte Carlo simulation,
   adding the training input dataset to the at least one of the first synthetic noise or the second synthetic noise, or
   applying a trained function;
   determining a resultant image dataset by applying the trained generator function to the second training image dataset;

adjusting a parameter of the trained generator function based upon a comparison of the first training image dataset and the resultant image dataset; and providing the trained generator function.

10. The method of claim 9, further comprising:

determining a first classification value by applying a trained classifier function to a difference between the resultant image dataset and the first training image dataset or the second training image dataset, wherein the parameter of the trained generator function is adjusted based upon the first classification value determined.

11. The method as claimed in claim 10, further comprising:

determining a second classification value by applying the trained classifier function to an expected difference image dataset; and adjusting a parameter of the trained classifier function based upon the second classification value.

12. A non-transitory computer-readable storage medium, storing a trained generator function provided by the method of claim 9.

13. A non-transitory computer-readable storage medium, storing program segments readable and executable by a training system to perform the method of claim 9 when the program segments are executed by the training system.

14. A provider system for providing a resultant image dataset for a volume of interest, the provider system comprising:

an interface, configured to receive an X-ray image dataset for the volume of interest, wherein the X-ray image dataset has a first noise level, and receive a trained generator function, a parameter of the trained generator function being based on a first training image dataset and a second training image dataset for a training volume of interest, wherein the first training image dataset and the second training image dataset have a first training noise level, and wherein the trained generator function is a generator function of a generative adversarial algorithm; and processing circuitry configured to determine the resultant image dataset for the volume of interest by applying the trained generator function to input data including the X-ray image dataset, wherein the resultant image dataset has a second noise level, the second noise level being less than the first noise level, wherein the interface is further configured to provide the resultant image dataset.

15. An X-ray apparatus comprising:

the provider system of claim 14.

16. The provider system of claim 14, wherein at least a portion of the noise of the first training image dataset is statistically independent of a portion of the noise of the second training image dataset.

* * * * *